(12) United States Patent
Blank et al.

(10) Patent No.: US 6,214,069 B1
(45) Date of Patent: Apr. 10, 2001

(54) PROCESS FOR THE MANUFACTURE OF A SINTERED, CERAMIC ABRASIVE AND GRINDING TOOLS WITH THIS ABRASIVE

(75) Inventors: Paul Blank; Andreas Krell, both of Dresden (DE)

(73) Assignee: Fraunhoffer-Gesellschaft zur Forderung der Angewandten Forschung E.V., Munich (DE)

(*) Notice: Subject to any disclaimer, the term of this patent is extended or adjusted under 35 U.S.C. 154(b) by 0 days.

(21) Appl. No.: 09/263,306

(22) Filed: Mar. 5, 1999

(30) Foreign Application Priority Data

Mar. 6, 1998 (DE) .............................. 198 09 679

(51) Int. Cl.$^7$ .................. C09K 3/14; B24D 3/00
(52) U.S. Cl. .............. 51/309; 51/307; 501/127; 501/153; 264/102; 264/299; 264/319; 264/603; 264/650; 264/653
(58) Field of Search ............. 51/309, 307, 293; 501/127, 153; 264/102, 319, 653, 662, 299, 603, 650

(56) References Cited

U.S. PATENT DOCUMENTS

| | | | |
|---|---|---|---|
| 4,623,364 | * | 11/1986 | Cottinger et al. ............ 51/309 |
| 4,799,938 | * | 1/1989 | Janz et al. ................. 51/309 |
| 4,918,874 | * | 4/1990 | Tiefenbach, Jr. ............ 51/309 |
| 5,516,348 | * | 5/1996 | Conwell et al. ............. 51/309 |
| 5,547,479 | * | 8/1996 | Conwell et al. ............. 51/309 |
| 5,593,467 | * | 1/1997 | Monroe .................... 51/309 |
| 5,728,184 | * | 3/1998 | Monroe .................... 51/309 |

FOREIGN PATENT DOCUMENTS

| | | |
|---|---|---|
| 4113476 | 10/1992 | (DE) . |
| 19503854 | 8/1996 | (DE) . |
| 19520614 | 11/1996 | (DE) . |
| 263810 | 4/1988 | (EP) . |
| 009510 | 2/1967 | (JP) . |

* cited by examiner

*Primary Examiner*—Michael Marcheschi
(74) *Attorney, Agent, or Firm*—Nils H. Ljungman & Associates

(57) ABSTRACT

An economical process for the manufacture of a polycrystalline, sintered, ceramic abrasive from a powder raw material is described, which process is characterized by the following process steps: preparation of a slip largely free from polymerizing and/or coagulating additives from the powder raw material; pressureless shallow casting of the slip in a vessel; degassing, drying and crushing of the cast sheet to obtain a fabricated material and sintering of the fabricated material to create the abrasive. This process can be used to manufacture an abrasive that permits extremely high grinding performance due to its extraordinary density and structural integrity.

12 Claims, No Drawings

PROCESS FOR THE MANUFACTURE OF A SINTERED, CERAMIC ABRASIVE AND GRINDING TOOLS WITH THIS ABRASIVE

The invention relates to a process for the manufacture of a polycrystalline, sintered, ceramic abrasive from a powder raw material, an abrasive manufactured according to this process and grinding tools with such an abrasive.

Two types of processes have attained particular importance for the manufacture of ceramic abrasives, namely sol gel processes and powder processes.

The objective during the development of sol gel processes for the manufacture of sintered ceramic abrasives, e.g. as claimed by Cottringer in U.S. Pat. No. 4.623.364, was to achieve increased hardness and grinding performance compared to prior art fused abrasives by replacing the internal structure of the latter, which was essentially monocrystalline, with a polycrystalline, highly uniform, pore-free structure of a submicrometer character (U.S. Pat. No. 4,623,364 discloses crystallites ranging from 0.2–0.4 $\mu$m, for example). Other sol gel processes are disclosed in DE 41 13 476and EP 0 63 810.

Analogous efforts to manufacture monolithic $Al_2O_3$ sintered products with grain sizes below 2 $\mu$m and improved mechanical properties from corundum/alumina powder [German: Korundpulver] (e.g. as disclosed in JP 700 35 720 B) essentially took one of two approaches, namely:

(a) the use of submicrometer or nanomicrometer powder with the finest possible grain or (b) the addition of substances to lower the dense densification temperature.

Extremely fine grained raw materials possess the high sinter activity desired, but are also accompanied by significant shaping problems due to their poor densification. The cost-effective uniaxial dry pressing method, the most common method currently used for the manufacture of monolithic parts, results in unsatisfactory green density or inhomogeneous densities within the molded body which when sintered result in defects that reduce hardness and strength. For these reasons, various other shaping processes are used, such as cold isostatic pressing, drawing [German: Strangziehen], slip casting in porous (absorbent) molds, pressure or centrifugal slip casting or gel casting. An $Al_2O_3$ grain size of 0.8 $\mu$m and a hardness of HV20=1920 was achieved by extruding ceramic bodies of submicrometer powders and sintering at 1400° C. (G. Riedel, et al., Silicates Industriels (1989) ½, 29–35); the powder used had an average grain size of 0.45 $\mu$m.

Slip casting is also used with very fine grain $Al_2O_3$ powders with $d_{50}$<0.4 $\mu$m (T.-Sh. Yeh et al., J. Am. Ceram. Soc. (1988), pp. 841–844), also in combination with the use of pressure (Pressure filtration: F. F. Lange et. al., Bull. Am. Ceram. Soc. (1987), pp. 1298–1504; Vacuum Pressure Filtration: H. Mizuta et al., J. Am. Ceram. Soc. (1992), pp. 469–473). As shown by Mizuta, for example, these complex processes can be used to achieve the heretofore best mechanical properties for pure sintered corundum, but even using hot isostatic pressing (HIP) it has not been possible to achieve a Vickers microhardness $\geq$2000 or bending strength $\geq$800 MPa.

The ability to improve the mechanical properties and grain size of $Al_2O_3$ sintered products manufactured from corundum powder with the additives to promote sintering is very limited. The addition of more than 1% doping agents, which form a liquid phase during sintering, reduces the dense densification temperature of submicrometer $Al_2O_3$ powders to 1200° C. and lower, yet toughness remains at the usual level for traditional sintered corundums of approx. 400 MPa (L. A. Cue et al., J. Am. Ceram. Soc. (1991), pp. 2011–2013), and the grain phase boundaries that are often produced result in poor high temperature characteristics, which is undesirable in machine tools in general and especially so in abrasives.

The disadvantage of such prior art $Al_2O_3$ sinter products manufactured from corundum powder is that no high grade, low defect $Al_2O_3$ sinter products with high hardness and strength are known to be manufacturable.

Unaware of relevant solutions to the problems previously achieved, current developments were concentrated on, among others, two approaches thought to be promising (T. J. Carbone, p. 107 in : L. D. Hart (editor), "Alumina Chemicals Science and Technology Handbook", The Am. Ceram. Soc., Westerville, Ohio, 1990):

(1) Improvement of sol gel technologies with nucleating additives (e.g. G. L. Messing and M. Kumagai in Bull. Am. Ceram. Soc. 73 (1194) 88–91), and (2) the development of the use of powders with extremely uniform grain size ("monosized", "uniform-sized") thought to be ideal as described by K. Yamada in "Alumina Chemicals Science and Technology Handbook" (Editor: L. D. Hart, The Am. Ceram. Soc., Westerville, Ohio, 1990 p. 564).

While the first approach fails to solve the general problem of the sol/gel process (the fact that the added germs are always more coarse than the primary raw material of the sol, thus hardly allowing the formation of an extremely low defect structure), the second approach results in increasingly expensive raw materials.

Special dispersing measures in conjunction with especially low defect powder shaping processes can be used to produce monolithic sintered corundum parts such as abrasives whose Vickers hardness (at test loads ranging from 10–100 N) exceed HV=2000 if the grain size is not larger than 1.5 $\mu$m. The bending strength of pressureless sintered parts is in excess of 800 MPa. Refer to WO-95/28364A2. As disclosed in this publication, a metal removing capacity equal to 182% of that of zirconium corundum was achieved when grinding the cross-section of a steel tube using a vulcanized fiber grinding wheel to which such an abrasive had been applied. However, WO-95/28364A2 also discloses that this progress is only achieved when using powder raw materials with a limited grain size distribution.

The disadvantage that all of the powder technology approaches described above have in common is that they require shaping processes for the manufacture of unsintered raw materials which are poorly suited for the manufacture of sinterable aggregate bodies of abrasive grit from both technological and economic standpoints (e.g. uniaxial matrix pressing, cold isostatic pressing of massive, block shaped parts, casting under pressure (pressure filtration) or the use of special binders [gel casting]).

Furthermore, the casting methods used within the framework of the sol/gel process to achieve low defect, unsintered raw products with sufficiently high base density do not offer an approach to overcoming the difficulties because the networking processes which occur during the transition of the sol into the gel state are tied to special characteristics of the sols that powder suspensions simply do not possess.

The object of the invention is therefore to create a process for the cost-effective manufacture of a high grade abrasive. A further object of the invention is to create grinding tools with significantly better grinding performance than grinding tools of the prior art.

This object can be achieved by means of a process having the following steps:

Preparation of a slip largely free from polymerizing and/or coagulating additives on the basis of a powder raw material;

Pressureless shallow casting [German: flachgiessen] of the slip in a tank/vessel/container;

Degassing, drying and crushing of the cast sheet to obtain a fabricated material and Sintering of the fabricated material to create the abrasive.

Surprisingly, this process enables the manufacture of an abrasive with which very good grinding performance can be achieved due to its extreme density and freedom from defects.

The conventional wisdom is that dense, low defect, sintered ceramic products can only be manufactured if the sinter process is performed on "green" fabricated materials of sufficient "green density" (generally>50%) in which the packing homogeneity of the powder particles is sufficiently high to prevent a spatial heterogenization [German: heterogenisierung] of the sinter shrinkage and the associated formation of coarser pores and defects (cracks). According to the prior art, existing "liquid" shaping processes achieve this only if, when casting into porous molds (e.g. of plaster), capillary forces generate pressure gradients affecting the liquid components of the slip, or if, when casting into either porous or dense molds, additional pressure is applied (pressure filtration or centrifugal casting of low viscosity slips, hot molding or injection molding of bodies with a high binder fraction) or polymerizing or coagulating additives are used (gel casting, DCC=direct coagulation casting).

Because one could not expect to manufacture "green" semi-finished products with sufficiently high "green density" and packing homogeneity without the application of any of the measures previously believed to be necessary, shallow casting as in the current invention into a vessel with no open porosity, applying no additional pressure and using no polymerizing or coagulating additives had not previously been considered for the manufacture of dense, low defect ceramic molded bodies or abrasive granulates. All the more surprising is the completely unexpected high quality of the sintered products which can be manufactured using the process of the current invention.

One particular economic advantage of the process as claimed by the current invention is due to the simplicity of the process and the ability to use raw materials which are comparable in price to those raw materials used for the manufacture of sol gel corundums. Another advantage over the sol gel process is the lower energy requirement as a consequence of the significantly higher solids content of the slip as claimed by the current invention, i.e. less water must be removed during drying.

An advantageous ecological aspect is that the process as claimed by the current invention requires no organic binders which are almost always required in ceramic processes and must later be thermally removed, polluting the air.

Surprisingly, the economic advantage can be combined with the advantage of the high quality of the abrasives manufactured using this process, whose grinding performance exceeds that of prior art zirconium corundums. When used in bonded abrasive products and in abrasives on a pad, the metal removing capacity of the abrasives of the current invention exceeds the performance of the best fused abrasives of the prior art.

This is achieved in one embodiment by means of a grinding tool with which at least a fraction of the abrasive is manufactured according to a process of current invention.

Advantageous embodiments of the invention are disclosed hereafter.

These teach that the powder raw material preferably has an average grain size of approx. 0.8 $\mu$m or less.

Pressureless shallow casting is preferably performed into a vessel with no open porosity.

Prior to crushing of the dried sheet, the material is preferably prefired at a temperature lower than the densification temperature.

The powder raw material comprises primarily corundum powder ($\alpha$-$Al_2O_3$).

Shallow casting is preferably performed with a sheet thickness of approx. 2 to 5 mm, and can employ shaping techniques to produce pre-formed/roughly embossed [German: vorgepraegt] separation points.

Degassing can be supported by either decreased air pressure or the addition of substances which reduce viscosity or surface tension. Drying is preferably performed at approx. 60° C.

The abrasive as claimed by the current invention is suitable—either alone or with other components—for use in all known forms of grinding tools, in particular in abrasive wheels, abrasives on a pad and honing tools, as well as a lapping, blasting or polishing agent.

Additional details, characteristics and advantages of the invention are disclosed in the following description of preferred embodiments of the invention.

A particularly preferred embodiment of the process as claimed by the current invention includes the following steps:

(1) Preparation of a water-based slip largely free from polymerizing or coagulating additives but that can contain additional doping components (sinter enhancers) and in which slip the required homogeneity of the dispersion is achieved by conventional means (e.g. stirrers, ultrasound, the use of dispersing agents to reduce slip viscosity or increase the solids content of the slip). The powder used is preferably $\alpha$-$Al_2O_3$, but other raw materials with similar material and crystallographic properties may also be used.

The average particle size of the powder raw material is preferably <0.8 $\mu$m, as the adhesions forces may not be sufficient with coarser powders to ensure sufficient strength of the dried fabricated materials in the unsintered state.

(2) Removal of non-dispersed, coarser powder agglomerates with a sieve (between 30–50 $\mu$m is appropriate) is followed by pressureless casting of an approx. 2–5 mm thick sheet in shallow vessels with no open porosity.

(3) The slip is degassed for several hours and dried at 60° C. Air pressure can be reduced (e.g. 200 mbar) to facilitate degassing; however, it is also possible to do without evacuation if surface tension or viscosity reducing additives are used. The cast and degassed slip can also be dried at room temperature, which requires longer drying times.

Dried sheets made from a slip with a solids content between 65 and 80% by mass generally have a green density between 55 and 65% by mass.

(4) During drying, macroscopic cracks form in the cast sheets, facilitating subsequent crushing. In light of the measures described in WO-95/28364A2, for example, as being necessary to satisfy the exacting requirements for the internal perfection (freedom from defects) of advanced abrasives manufactured using powder processes, it is extremely surprising that the resulting fragments, whose structure was produced without the application of force and requires no organic or other binders, not only have a sufficiently high green density to allow low dense densification temperatures but are also characterized by an extremely low rate of internal defects. This is the only explanation for the excellent grinding performance achieved with the products as claimed by the current invention.

One feature of the present invention resides broadly in a process for the production of a polycrystalline, sintered, ceramic abrasive material that is in the form of a powdered raw material; the working of a polymerizable and/or coagulating material as an additive in a substantially free slurry from the polymerized raw material without pressure; flat pouring or cast in a container or mold; outgassing or degassing, drying and shrinking the enlarged layer to form a pre-product; and sintering the preproduct to form the abrasive material.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

The following U.S. Patents, which may contain polycrystalline ceramic abrasives, or materials or methods for their manufacture, which may be incorporated in embodiments of the present invention, are hereby incorporated by reference as if set forth in their entirety herein: No. 5,387,268, issued Feb. 7, 1995 to Hiraiwa et al.; No. 5,456,735, issued Oct. 10, 1995 to Ellison-Hiyashi et al.; No. 5,474,583, issued Dec. 12, 1995 to Celikkaya; No. 5,388,317, issued Feb. 14, 1995 to Johansen et al.; No. 5,389,118, issued Feb. 14, 1995 to Hinterman et al.; No. 5,431,704, issued Jul. 11, 1995 to Tamamaki et al.; No. 5,431,705, issued Jul. 11, 1995 to Wood; No. 5,443,603, issued Aug. 22, 1995 to Kirkendall; No. 5,447,466, issued Sep. 5, 1995 to Wang et al.; No. 5,453,104, issued Sep. 26, 1995 to Schwabel; No. 5,474,583, issued Dec. 12, 1995 to Celikkaya; No. 5,855,996, issued Jan. 5, 1999 to Corrigan et al.; No. 5,601,477, issued Feb. 11, 1997 to Bunting et al.; No. 5,524,719, issued Jun. 11, 1996 to Dennis; No. 5,443,605, issued Aug. 22, 1995 to Suzuki et al.; No. 5,261,930, issued Nov. 16, 1993 to Fliedner et al.; No. 5,213,592, issued May 25, 1993 to Newkirk; No. 5,034,360, issued Jul. 23, 1991 to Bartels et al.; No. 4,944,772, issued Jul. 31, 1990 to Cho; No. 4,867,758, issued Sep. 19, 1989 to Newkirk; No. 4,828,582, issued May 9, 1989 to Frushour; No. 4,824,442, issued Apr. 25, 1989 to Cerceau; No. 4,776,861, issued Oct. 11, 1988 to Frushour; No. 4,606,738, issued Aug. 19, 1986 to Hayden; No. 5,855,842, issued Jan. 5, 1999 to Trigg et al.; No. 5,855,841, issued Jan. 5, 1999 to Trigg et al.; No. 5,876,470, issued Mar. 2, 1999 to Abrahamson; No. 5,827,781, issued Oct. 27, 1998 to Skrovan et al.; and No. 5,752,996, issued May 19, 1998 to Wood.

The following foreign patent documents are hereby incorporated by reference as if set forth in their entirety herein: Federal Republic of Germany Patent No. 41 13 476; European Patent No. 0 263 810; Japanese Patent No. 700 35 720 B; and International Patent Application No. WO 95/28364A2.

All, or substantially all, of the components and methods of the various embodiments may be used with at least one embodiment. or all of the embodiments, if any, described herein.

All of the patents, patent applications and publications recited herein are hereby incorporated by reference as if set forth in their entirety herein.

The corresponding foreign patent publication applications, namely, Federal Republic of Germany Patent Application No. 198 09 679, filed on Mar. 6, 1998, having inventors Paul Blank and Andreas Krell, and DE-OS 198 09 679.8 and DE-PS 198 09 679.8, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

To maintain this same low defect rate after final crushing of the dried sheet down to abrasive grit size (e.g. in a jaw crusher), crushing can be preceded by prefiring at a temperature lower than the densification temperature to increase green density. Prefiring reduces porosity by less than 10%. The temperature is a function of the powder raw material used and is between 600 and 800° C. for corundum.

Shallow casting of the slip dispersion can also employ shaping techniques to create pre-formed separation points to facilitate crushing.

(5) In the final step, the fabricated material is sintered as a bulk material under conditions appropriate for the respective raw materials.

The invention is described below with reference to several embodiments and the grinding performance achievable with each of them. Example 1 discloses a particularly advantageous embodiment with respect to its properties for a product with extremely high grinding performance, whereas Example 2 is particularly advantageous from an economical standpoint.

EXAMPLE 1

250 g of a highly pure (99.99% $Al_2O_3$) and particularly finely dispersed α-alumina with a narrow range of grain size ($d_{16}$= 0.13 μm, $d_{50}$=0.19 μm, $d_{84}$=0.25 μm, BET=14 $m^2/g$) was dispersed in a stirrer in 100 ml of distilled water with a pH of 4 by means of stirring and ultrasound (solids content 71.4%).

The dispersion was then cast to form a 3–5 mm thick sheet, dried and degassed for 5 hours in a vacuum drying cabinet at 200 mbar and 60° C.

After prefiring in air for 2 hours at 600° C., the sheet was crushed down to abrasive grit in a jaw crusher and air sintered for 2 hours at 1270° C.

Density was measured by means of mercury porosimetry. Grain size characterization was by means of intercepted segment analysis of polished and thermally etched surfaces (grain size=1.56×average chord length). The test load for determining the Vickers hardness HV1 was 9.81 N and was applied for 30 s. Fracture toughness was measured using the indentation method (length of cracks at HV1 indentations measured).

The following properties were identified:

| | |
|---|---|
| Density: | 3.93 g/cm³ (absolute) |
| | 98.6% (relative) |
| Average grain size: | 0.9 μm |
| Hardness HV1: | 2110 ± 60 |
| Fracture toughness $K_{IC}$: | 3.6 ± 0.2 MPa √m |

An analogous experiment with the addition of 0.1% by mass MgO, added to the slip as nitrate solution, exhibited a 0.7 μm smaller average crystallite size and improved sinter density of 3.96 g/cm³ (99.3%). This did result in any improvement to the mechanical properties, however.

EXAMPLE 2

300 g of a finely dispersed α-alumina ($d_{16}$=0.2 μm, $d_{50}$=0.3 μm, $d_{84}$=0.6 μm, BET=9 m²/g) with a purity of 99.8% $Al_2O_3$ was dispersed in a stirrer together with a magnesium nitrate solution (0.1% by mass MgO relative to the sintered end product) as a doping agent in 105 ml of water with a pH of 4 by means of stirring and ultrasound for 30 minutes, followed by grinding for 2 hours in a high-speed, vertical, laboratory agitating ball mill (the suspension had a solids content of 74.1%). The alumina used here costs approx. 10 DM/kg.

The dispersion was then cast to form a 3–5 mm thick sheet, dried and degassed for 5 hours in a vacuum drying cabinet at 200 mbar and 60° C.

After prefiring in air for 2 hours at 800° C., the sheet was crushed down to abrasive grit in a jaw crusher and air sintered for 2 hours at 1480° C.

All measurements were taken as described for Example 1. The following properties were identified:

| | |
|---|---|
| Density: | 3.94 g/cm³ (absolute) |
| | 98.8% (relative) |
| Average grain size: | 1.3 μm |
| Hardness HV1: | 1930 ± 40 |
| Fracture toughness $K_{IC}$: | 3.5 ± 0.4 MPa √m |

EXAMPLE 3

300 g of a highly pure (99.99% $Al_2O_3$), finely dispersed α-alumina ($d_{16}$=0.20 μm, $d_{50}$=0.32 μm, $d_{84}$=0.60 μm, BET= 10.5 m²/g) with a purity of 99.8% $Al_2O_3$ was dispersed in a stirrer together with a magnesium nitrate solution (0.1% by mass MgO relative to the sintered end product) in 100 ml in the same manner as described in Example 2(the suspension had a solids content of 75.0%).

The dispersion was then cast to form a 3–5 mm thick sheet, dried and degassed for 5 hours in a vacuum drying cabinet at 200 mbar and 60° C.

After prefiring in air for 2 hours at 800° C., the sheet was crushed down to abrasive grit in a jaw crusher and air sintered for 2 hours at 1480° C.

All measurements were taken as described for Example 1. The following properties were identified:

| | |
|---|---|
| Density: | 3.96 g/cm³ (absolute) |
| | 99.2% (relative) |
| Average grain size: | 1.5 μm |
| Hardness HV1: | 1950 ± 40 |
| Fracture toughness $K_{IC}$: | 3.3 ± 0.3 MPa √m |

EXAMPLE 4

300 g of alumina from Example 1 was dispersed in 100 ml of distilled water with a pH of 4 by means of stirring and ultrasound for 30 minutes followed by grinding for 2 hours in a laboratory agitating ball mill as in Example 2. The solids content of the suspension was 73.7% by mass.

Casting of the suspension, as well as degassing, drying, prefiring and crushing all were performed as in Example 1. These actions were followed by air sintering for 2 hours at 1350° C.

Despite the higher densification temperature compared to Example 1, a fine grained structure with increased hardness is achieved. All measurements were taken as described under Example 1. The following properties were identified:

| | |
|---|---|
| Density: | 3.96 g/cm³ (absolute) |
| | 99.2% (relative) |
| Average grain size: | 0.57 μm |
| Hardness HV1: | 2159 ± 54 |
| Fracture toughness $K_{IC}$: | 3.1 ± 0.3 MPa √m |

EXAMPLE 5

Sintered abrasive grit, grain P36, from each of the Examples 1 through 4 was used as the abrasive during the manufacture of a vulcanized fiber grinding wheel with a diameter of 180 mm, and the grinding performance of the grit was compared to that of two types of fused corundum in the test described below:

Workpiece: Welded steel tube of bright, cold-rolled sheet (St W 22 DIN 1543), 160 mm in diameter, 1 mm wall thickness.

Grinding parameters: Grinding wheel speed: 6000 rpm; tube speed 16.3 rpm, corresponding to a circumferential speed of 10 m/min; applied force 30 N.

Measured value: abraded steel in grams.

A large amount of material removed from the workpiece indicates high grinding performance. The total amount of material removed was measured after 1, 2, 3 and 4 minutes.

Standard corundum:

| | | | |
|---|---|---|---|
| 41 g (1 min) | 64 g (2 min) | 83 g (3 min) | 99 g (4 min) |

Eutectic zirconium corundum:

| | | | |
|---|---|---|---|
| 49 g (1 min) | 76 g (2 min) | 99 g (3 min) | 119 g (4 min) |

Sintered corundum of the current invention:

Example 1:

| | | | |
|---|---|---|---|
| 68 g (1 min) | 121 g (2 min) | 165 g (3 min) | 193 g (4 min) |

-continued

Example 2:

| 58 g (1 min) | 94 g (2 min) | 125 g (3 min) | 154 g (4 min) |
|---|---|---|---|

Example 3:

| 53 g (1 min) | 93 g (2 min) | 124 g (3 min) | 153 g (4 min) |
|---|---|---|---|

Example 4:

| 53 g (1 min) | 139 g (2 min) | 188 g (3 min) | 232 g (4 min) |
|---|---|---|---|

The results demonstrate that the abrasive of the current invention improves grinding performance to 155–234% of that of standard corundum and to 129–195% of that of zirconium corundum.

What is claimed is:

1. A process for the manufacture of a polycrystalline, sintered, ceramic abrasive from a raw material powder, said process comprising the steps of:

preparing a slip essentially free of polymerizing and/or coagulating additives, and comprising a raw material powder;

casting the slip on a surface with no open porosity to obtain a cast sheet, said step of casting comprising pressureless shallow casting;

degassing, drying, and crushing the cast sheet to obtain a fabricated material; and sintering the fabricated material to produce a polycrystalline, sintered, ceramic abrasive.

2. The process according to claim 1, wherein the raw material powder has an average grain size less than or equal to about 0.8 micrometer.

3. The process according to claim 1, wherein said step of preparing the slip from the raw material powder comprises the step of using distilled or deionized water as a dispersant.

4. The process according to claim 1, wherein said process comprises the additional step of prefiring the cast sheet, after said step of drying, at a temperature lower than the densification temperature of the sheet.

5. The process according to claim 1, wherein the raw material powder comprises corundum powder (alpha-aluminum oxide)($\alpha$-$Al_2O_3$).

6. The process according to claim 3, wherein the slip has a solids content between approximately 65 percent and approximately 80 percent by mass.

7. The process according to claim 1, wherein the raw material powder comprises at least one additional doping agent as a sinter enhancer.

8. The process according to claim 7, wherein said at least one additional doping agent comprises magnesium nitrate.

9. The process according to claim 3, wherein the dispersion is free of organic binders.

10. The process according to claim 1, wherein said step of shallow casting produces a shallow casting having a thickness of approximately 2 millimeters to approximately 5 millimeters.

11. The process according to claim 1, wherein said step of degassing is performed by means of one of:

decreasing air pressure; and adding substances which reduce viscosity or surface tension.

12. The process according to claim 1, wherein said step of drying comprises drying at approximately 60 degrees Celsius.

* * * * *

UNITED STATES PATENT AND TRADEMARK OFFICE
CERTIFICATE OF CORRECTION

PATENT NO. : 6,214,069 B1
DATED : April 10, 2001
INVENTOR(S) : Paul Blank and Andreas Krell Page 1 of 1

It is certified that error appears in the above-identified patent and that said Letters Patent is hereby corrected as shown below:

Column 1,
Line 59, after "microhardness", delete "≧2000" and substitute -- ≥2000 --.
Line 60, before "Mpa.", delete "≧800" and substitute -- ≥ 800 --.

Column 4,
Line 42, after "preferably", delete "<0.8" and substitute -- ≤0.8 --.

Signed and Sealed this

Fifth Day of February, 2002

Attest:

Attesting Officer

JAMES E. ROGAN
Director of the United States Patent and Trademark Office